July 29, 1958    G. D. PERKINS    2,845,597
SYSTEM FOR DIGITIZING ANALOG SIGNALS
Filed Sept. 4, 1956    3 Sheets-Sheet 1

INVENTOR.
GEORGE D. PERKINS
BY
Christie, Parker & Hale
ATTORNEYS

INVENTOR.
GEORGE D. PERKINS

INVENTOR.
GEORGE D. PERKINS
BY
Christie, Parker & Hale
ATTORNEYS

United States Patent Office 2,845,597
Patented July 29, 1958

2,845,597

SYSTEM FOR DIGITIZING ANALOG SIGNALS

George D. Perkins, Duarte, Calif., assignor to Consolidated Electrodynamics Corporation, Pasadena, Calif., a corporation of California Application September 4, 1956, Serial No. 607,627

4 Claims. (Cl. 324—103)

This invention relates to analog-to-digital converters. More particularly, this invention relates to a system for obtaining a digital representation of the peaks or troughs of analog signals.

One of the problems connected with digitizing peaks or troughs of analog signals is that of accurately determining and measuring the true maximum value of the peaks or the true minimum value of the troughs. For example, in mass spectrometry the peak heights of the mass spectrometer signals must be determined accurately in order to ascertain the mass of elements contained in the sample being investigated.

Various methods have been proposed for detecting the maximum value of a mass peak such as the use of differentiators, phase sensing and mechanical limit detection. Following detection, the value was held mechanically or in a capacitor and then digitized.

The present device is fast enough to digitize the peak as rapidly as it is produced by the mass spectrometer. When the maximum is reached, a value is already in the digitizer.

This is done by utilizing an electronic stepping circuit which is capable of stepping at high speeds, say up to one million steps per second. The electronic stepping circuit is used to step-up or step-down a reference voltage. The reference voltage is fed to a comparison circuit. The signal, the peaks of which are to be determined, is also fed to the comparison circuit. The difference between the reference voltage and the signal as well as the polarity of the difference is used to cause the stepping circuit to step in the proper direction to approach the same voltage as the signal voltage.

In order to accurately measure the peak heights, various problems had to be overcome. Some of these problems are the following:

(1) The electronic stepping circuit steps at the rate of as much as one million per second. This stepping circuit follows the voltage level of the input signal, the peaks of which are being determined. The digitized representation of the input signal must be recorded; the recorded digital representation must be a true representation. Because of the fast rate of stepping, some means had to be devised to temporarily halt the down-stepping of the reference voltage until the recording circuit has had sufficient time to record the digital representation of the peak voltage.

(2) Some means had to be devised to permit the stepping circuit to step down after the maximum has been recorded. This permits the stepping reference voltage to follow the input signal as the magnitude decreases to zero.

(3) Once the stepping circuit begins to increase the reference voltage in response to an increase in the input signal, means had to be provided to lock the stepping circuit against any down-counting until the peak has been ascertained, and recorded.

My improved analog-to-digital converter for digitizing input signals solves all of the mentioned problems and provides the art with a peak digitizer which digitizes the peaks substantially simultaneously with the time of the receipt of the peaks at the comparison circuit. The manner in which this is done will become evident as the new system is described herein.

A more detailed discussion of the various aspects of the circuits of the invention is taken up with reference to the drawings, in which.

Figure 1:
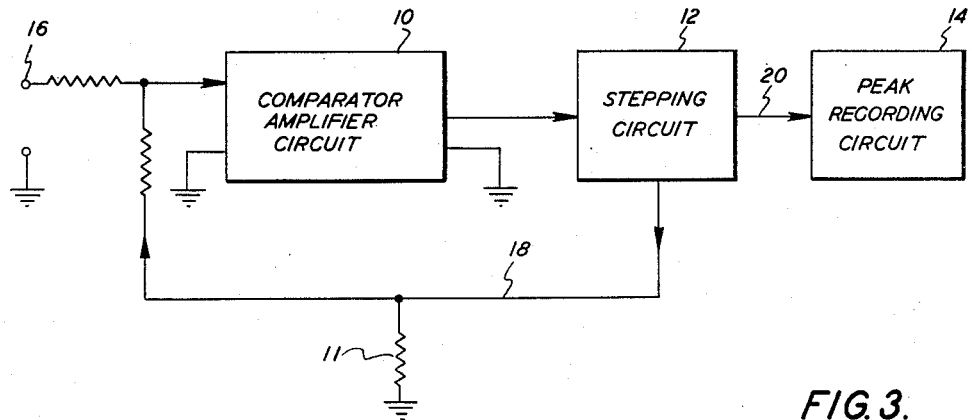
Fig. 1 is a block diagram showing the main components of my invention.

Fig. 1 shows a comparison amplifier circuit 10, a stepping circuit 12 and a peak recording circuit 14.

The signal, the peaks of which it is desired to determine, is conducted from terminal 16 through a resistor to the comparator amplifier circuit 10. For example, this signal may be the output from a mass spectrometer. The stepping circuit 12 is used to generate a reference voltage across resistor 11 which is also fed to the comparator amplifier circuit 10 through lead 18. The difference between the input signal and the reference voltage is amplified by amplifier 10 and then fed to the stepping circuit 12. The reference voltage is then stepped up or stepped down according to the polarity of the signal received from the comparator amplifier circuit 10. This polarity is determined by the magnitude of the reference voltage already being fed to the comparator amplifier circuit 10 when compared with the input signal being fed from terminal 16 to the comparator amplifier circuit 10.

If the input signal between the terminal 16 and ground is greater than the reference voltage between lead 18 and ground, the comparator amplifier circuit output is of a polarity to cause the stepping circuit 12 to step the reference voltage up until the reference voltage is equal to the input signal. Conversely, if the input signal across lead 16 and ground is less than the reference voltage with respect to ground, the polarity of the comparator amplifier circuit output is such that the stepping circuit 12 will step down the reference voltage until it equals the input signal voltage.

When each peak of the input signal is reached, a signal is permitted to flow from the stepping circuit 12 through lead 20 to the peak recording circuit 14. The peak is then recorded by recording circuit 14. This recording may be in the form of a digital representation of the peak of the analog signals.

Figure 2:
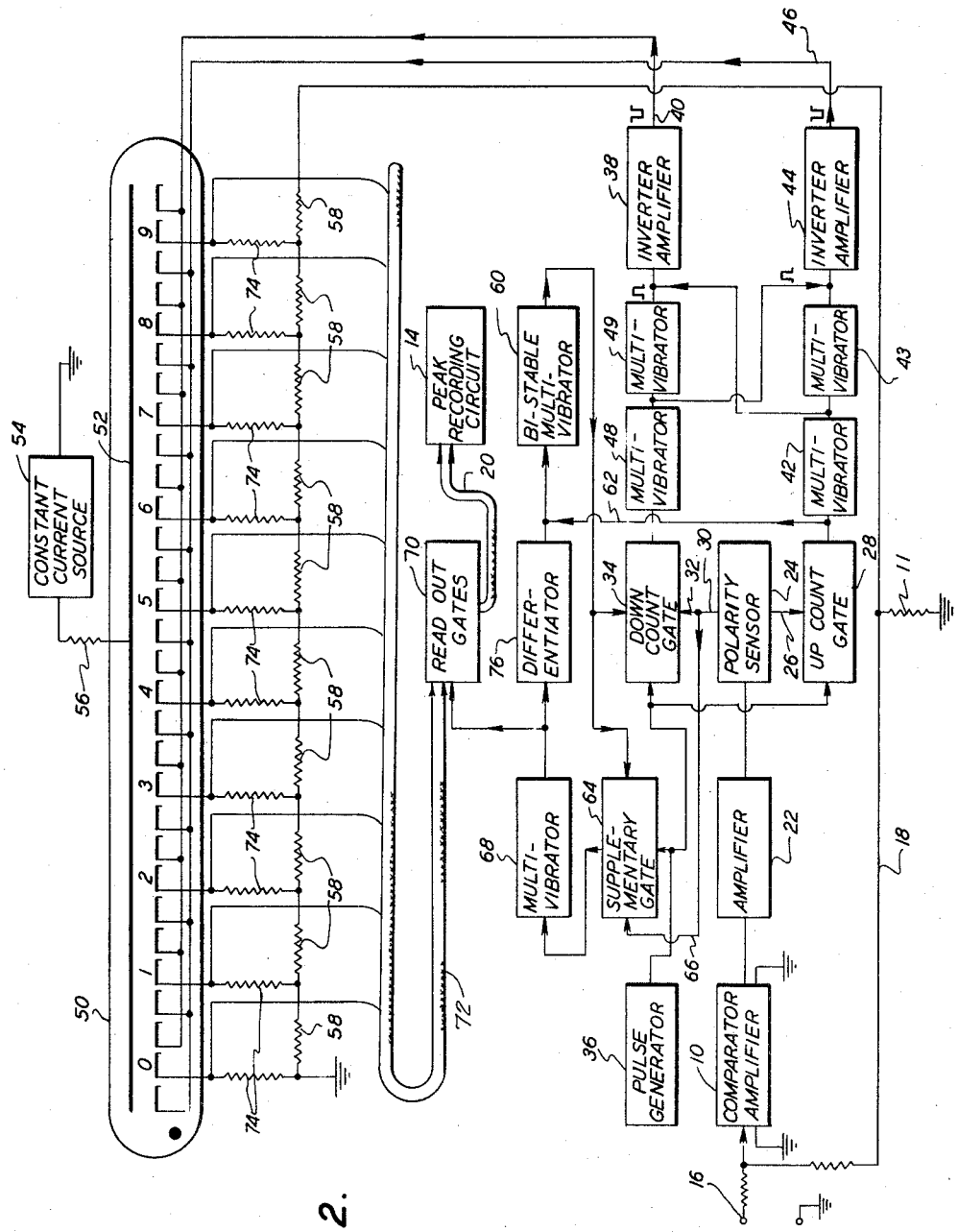
Fig. 2 is a diagram, partly in block and partly schematic, showing in detail the elements utilized in my invention.

Fig. 2 shows in more detail the elements used in my new peak determining circuit. The reference voltage in lead 18 is compared with the input signal from terminal 16. The comparator amplifier circuit output is amplified by a direct current amplifier 22 and then fed to a polarity sensor 24. The comparator amplifier circuit 10 has an output only if there is a difference between the reference voltage and the input signal.

The polarity sensor 24 senses the polarity of the differential voltage. If the input signal from terminal 16 is greater than the reference voltage, the polarity sensor 24 feeds a signal through a lead 26 to an up-count gate 28. If the input signal from terminal 16 is less than the reference voltage, the polarity sensor 24 feeds a signal through leads 30 and 32 to a down-count gate 34.

A pulse generator 36 is connected to the up-count gate 28 and the down-count gate 34. The pulse generator 36 is continually supplying pulses to the up-count gate 28 and the down-count gate 34. However, the gates 28 and 34 will not permit the pulses to pass unless a signal is received from the polarity sensor 24. If an up-count signal is received by up-count gate 28, the pulses from pulse generator 36 are permitted to pass. The pulse actuates one-shot multivibrator 42, the output of the multivibrator being amplified by inverter amplifier 38 and fed into lead 40. The return of multivibrator 42 to its stable state actuates multivibrator 43 which generates a signal to amplifier 44 and lead 46.

If the down-count gate 34 receives a signal from the polarity sensor 24, the pulses from the pulse generator 36 are passed through gate 34. These pulses actuate one-shot multivibrator 48, the output being amplified by amplifier 44 and fed to lead 46. The return of multivibrator 48 to its stable state actuates one-shot multivibrator 49 which generates a signal through inverter amplifier 38 and lead 40.

A particularly useful electronic stepping circuit component is an electronic tube which includes a single plate and a plurality of cathodes. The tube consists of a glass envelope 50 having a single plate 52. The plate voltage is obtained from a constant current source 54 which is fed through a resistor 56 to the plate 52.

The plate 52 is common to a group of primary cathodes and two groups of auxiliary cathodes. The primary cathodes are each connected to a different point on a voltage divider circuit consisting of a group of equal resistances 58 connected between the primary cathode representing the highest voltage, and ground. The primary electrodes are identified in Fig. 2 by numbers ranging from 0 to 9. The numbers over the primary cathodes identify a particular digital representation when current is flowing from a particular one of the cathodes to the plate 52. For example, when current flows from primary cathode number 1 to the plate 52, a particular voltage appears between lead 18 and ground. If the current flow is moved from primary cathode 1 to primary cathode 2, the voltage drop between the lead 18 and ground will be doubled by the action of the voltage divider. The voltage across primary cathode 1 is given the digital value "one" with multiples of this basic voltage being given digital values accordingly.

One auxiliary cathode in each group of auxiliary cathodes is located between each primary cathode. The first group of auxiliary cathodes are connected to common lead 40. The second group of auxiliary cathodes are connected to common lead 46. Trigger pulses applied to leads 40 and 46 in sequence move the flow of current either from a primary cathode to a higher valued primary cathode or from a primary cathode to a lower valued primary cathode according to whether a trigger pulse is passed first through lead 40 or lead 46. For example, if current flows from primary cathode 1 to plate 52, the voltage can be stepped-up by passing a pulse first through lead 40 and then through lead 46. The voltage can be stepped down by reversing the trigger voltage sequence and passing a pulse through lead 46 and then through lead 40.

Hence, it can be seen that the stepping circuit follows the increasing or decreasing magnitude of the input signal with the particular primary cathode through which current is flowing determining the digital representation of the input analog signal.

A Sylvania type 6476 multiple-cathode glow discharge tube such as that illustrated may be used. This tube is capable of stepping at a rate of 4000 steps per second. Other types of tubes can be used such as certain Haydu magnetron beam switching tubes capable of stepping as high as a million steps per second. The rate of pulses from pulse generator 36 should correspond closely to the stepping rate of the tube used.

However, it is desired that the peaks of the analog input signal be ascertained. It is desired that these peaks be recorded in digital form simultaneously with the receipt of the peaks. It is necessary that a digital representation of the peaks only be recorded and all other digital representations be excluded. Because of the very high stepping rate of the multiple electrode gas filled tube, some means for temporarily preventing a down-count after the maximum up-count has been obtained for a period long enough to record the maximum up-count is necessary. The remaining parts of my new system provide all of the foregoing requirements.

Included in the system shown in Fig. 2 is a bi-stable multivibrator 60. The multivibrator 60 may be any commonly used type of bi-stable multivibrator such as a Schmitt Trigger Circuit or an Eccles-Jordan multivibrator. The multivibrator 60 is coupled to the up-count gate 28 through lead 62.

Assume that a zero voltage has appeared across terminal 16 and ground and that the input signal between the terminal and ground begins to increase. The increase is sensed by the polarity sensor 24 and the up-count gate 28 is opened permitting a pulse from pulse generator 36 to pass therethrough. This pulse is also fed through lead 62 to the multivibrator 60. The trigger pulse causes multivibrator 60 to assume a different bi-stable state. The change in stable equilibrium is conducted to the down-count gate 34. The down-count gate 34 is thereby biased to a closed position. Therefore, no down-count pulses are permitted to flow through the down-count gate 34 as long as multivibrator 60 remains in this particular stable equilibrium state.

The change in equilibrium is also fed to a supplementary gate 64. It will be noticed that the supplementary gate 64 is continually being fed pulses from pulse generator 36. However, these pulses are not permitted to flow through the supplementary gate 64 unless the gate is sensitized by a pulse from multivibrator 60 and also a signal is fed to gate 64 from polarity sensor 24 through leads 30 and 66.

Hence, the multivibrator 60 performs the following functions:

(1) It responds to the first up-count to bias the down-count gate 34 to a closed position thus preventing any down counts until the bi-stable equilibrium of the multivibrator is again changed.

(2) It sensitizes the supplementary gate 64 so that a pulse can be passed through the supplementary gate when the first down-count signal is received from polarity sensor 24.

The supplementary gate 64 is coupled to a one-shot multivibrator 68. When the first down-count signal is received by supplementary gate 64, a pulse triggers the multivibrator 68 from its stable state to its unstable state.

The multivibrator 68 controls read-out gate circuits 70 which are coupled to the multi-electrode tube through a cable 72. The actuation of the read-out gate circuits 70 causes the peak recording circuit to record a digital representation of the particular primary cathode through which current is flowing. The flow of current represents the peak of the input signal. The information is fed to the recording circuit 14 through cable 72, read-out gates 70 and cable 20. Resistances 74 are provided in the primary cathodes and must be large enough to provide enough voltage difference between each successive primary cathode to enable the recording circuit to distinguish between them. The time constant of the one-shot multivibrator 68 is long enough to permit the signal to be transferred from the multi-electrode tube to the recording circuit 14. The recording circuit can be a printer, relay bank, magnetic tape or most any other type of permanent or temporary storage device.

Coupled between the multivibrator 68 and the multivibrator 60 is a differentiator 76. The change in stable equilibrium in one-shot multivibrator 68 is therefore conducted to differentiator 76. The differentiator 76 emits pulses which are representative of the rate of change in the pulse from one-shot multivibrator 68. Since the pulse from multivibrator 68 is approximately a square wave, a pulse is emitted from differentiator 76 only when the multivibrator 68 changes from one state to another. The pulse emitted from differentiator 76 when the multivibrator 68 returns to its normal bi-stable state after it has been activated, is of the proper polarity to trigger multivibrator 60 to its second bi-stable state. Hence, multivibrator 60 remains in a bi-stable state initiated by the first up-count signal until it is again triggered by a signal from differentiator 76. This occurs only after the peaks of the input signals from terminal 16 have been determined and recorded in digital form.

The triggering of multivibrator 60 by differentiator 76 results in the down-count gate 34 being unbiased and the supplementary gate 64 being de-sensitized. This permits the following to occur:

(1) The reference voltage is now permitted to step down to follow the decreasing magnitude of the input signals.

(2) Since the supplementary gate 64 is de-sensitized, the down counts are not passed through it and hence are not recorded by recording circuit 14.

After the down count has again reached a zero voltage and the signal begins to increase again, the down-count gate 34 is closed and the cycle repeated.

Figure 3:
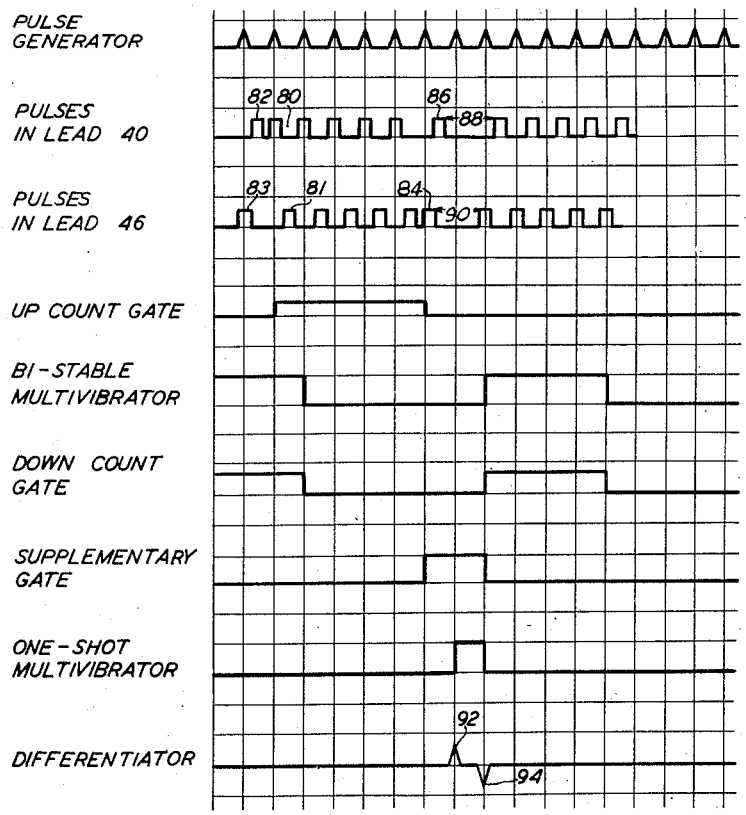
Fig. 3 is a graphic representation useful in explaining the operation.

The operation of my new method for digitizing an input signal may be better understood by referring to Fig. 3 in conjunction with Fig. 2. The regularly spaced pulses from the pulse generator 36 are illustrated in the top line. These pulses are emitted from the pulse generator at equal time intervals.

A first up-counting of the reference voltage is indicated by the fact that pulse 80 through lead 40 precedes pulse 81 through lead 46 for the first time. The fact that pulse 82 in lead 40 came after pulse 83 through lead 46 indicates that the pulses preceding pulses 80 and 81 were down-counting pulses.

When the system begins to increase the reference voltage, a signal is fed through lead 26 (see Fig. 2) to open the up-count gate 28 and hold it open during the period of increasing reference voltage. The pulses from the pulse generator are thus permitted to flow through the up-count gate 28. These pulses flow through leads 40 and 46 in the proper sequence to continually step-up the reference voltage. After up-count gate 28 is opened, the bi-stable multivibrator 60 is triggered to its lower bi-stable state, thereby sensitizing the supplementary gate 64 and closing the down-count gate 34. Down-count gate 34 remains closed until bi-stable multivibrator 60 again changes its voltage state.

The stepping up of the reference voltage is continued until the reference voltage exceeds the input signal across terminal 16 and ground. When this occurs a pulse 84 through lead 46 precedes a pulse 86 through lead 40 (see Fig. 3). Also, a signal from the polarity sensor 24 is conducted through leads 30 and 66 to the supplementary gate 64 to open the gate (see Fig. 2). Since the down-count gate 34 is closed the stepping down of the reference voltage is halted temporarily to permit the recording of a digital representation of the peak of the signal across terminal 16 and ground. The temporary halt of the down-stepping of the reference voltage is indicated by the spaces 88 and 90 in the lines of Fig. 3 illustrating the sequence of pulses through leads 40 and 46.

Since the supplementary gate 64 is now open, a pulse from pulse generator 36 is permitted to flow through this gate to the one-shot multivibrator 68 and trigger multivibrator 68 into its unstable state.

The triggering of the multivibrator 68 opens the read-out gate 70 for a period of time sufficient to permit the recording of the peak. This period of time is determined by the resistance and capacitance parameters of the multivibrator. The read-out time varies according to the type of read-out system used. If magnetic tape is used, for example, 100 microseconds is sufficient read-out time.

After sufficient time has elapsed for recording the digital representation of the peak, the one-shot multivibrator 68 returns to its stable state, thereby closing the read-out gate 70.

The changes in the state of the multivibrator 68 are differentiated by the differentiator 76 which emits pulse 92 when the multivibrator changes from its stable state to its unstable state and pulse 94 when the multivibrator changes from its unstable state to its stable state. Pulse 94 is of the proper polarity to trigger the bi-stable multivibrator 60 into its higher stable state. The supplementary gate 64 is then de-sensitized, preventing any other pulses from the pulse generator flowing into the multivibrator 68.

The change from the lower stable state to the higher stable state also opens down-count gate 34. Pulses are then permitted to flow through the down-count gate 34 and leads 46 and 40 in the proper sequence to step-down the reference voltage. Because of the high rate at which the steps occur the recording of the peak is accomplished at substantially the same time as the peak is obtained.

The stepping tube shown in Fig. 2 with the primary cathodes and the auxiliary cathodes in line and below the plate 52 is shown this way for purposes of clarity. In the actual tube the primary cathodes and the auxiliary cathodes are evenly spaced around a circular-disc plate 52. The stepping tube therefore acts like a rotary switch. The transition from the "0" primary cathode to the "9" primary cathode, or from the "9" primary cathode to the "0" primary cathode results in a change in potential across the voltage divider of nine times the change in potential necessary to indicate an increase or decrease of one step in the reference voltage.

Figure 4:
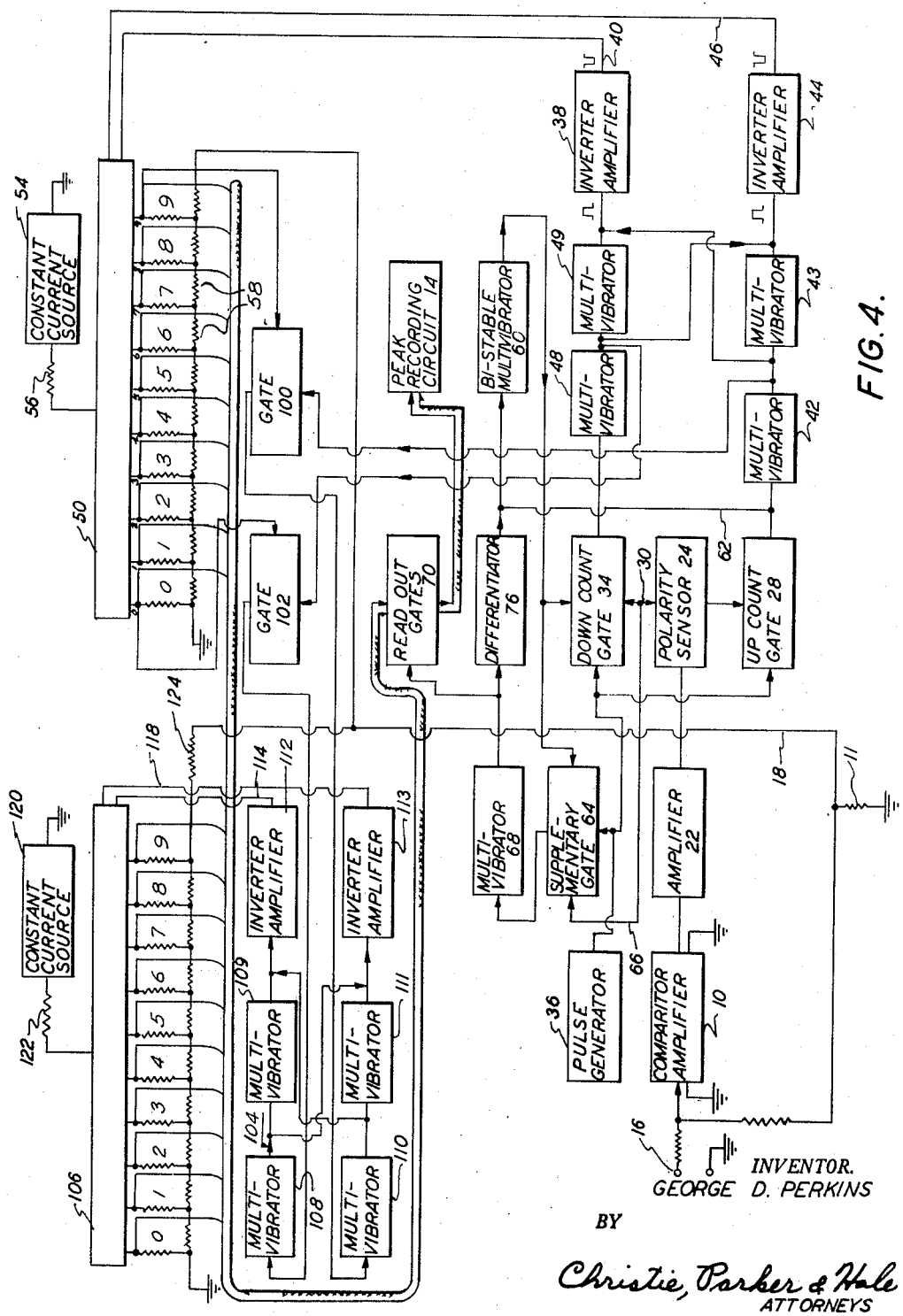
Fig. 4 is a block and schematic diagram showing another embodiment.

The problem of having too much of a voltage change when the stepping voltage changes from "0" to "9," or vice versa, is solved by the inclusion of a carry-over circuit, and a second stepping tube, as shown in Fig. 4, wherein like elements to the elements shown in Fig. 2 are referred to by like references.

The carry-over circuit includes a gate 100 which is coupled to the "9" primary cathode of the stepping switch 50. A second gate 102 is coupled to the "0" primary cathode of the stepping switch 50. Gates 100 and 102 are also coupled to multivibrator 42 and multivibrator 48, respectively.

When the stepping voltage in stepping tube 50 causes current to be conducted through primary cathode "9," the gate 100 is opened, thus permitting a pulse to be fed from the pulse generator 36 through up-count gate 28, multivibrator 42 and gate 100 to a second stepping system indicated generally by the numeral 104.

When the stepping voltage in tube 50 is such that a current is fed through primary cathode "0," gate 102 is opened and pulses from pulse generator 36 flow through down-count gate 34, multivibrator 48 and gate 102 to stepping system 104.

Stepping system 104 includes a stepping tube 106 similar to the stepping tube 50 shown in detail in Fig. 2. Also included are multivibrator circuits 108, 109, 110, 111 and inverter amplifiers 112 and 113.

The pulse passed through gate 100 is fed to multivibrator 110, the output from multivibrator 110 being fed to the inverter amplifier 112 to lead 114. The return of multivibrator 110 to its stable state actuates multivibrator 111 which passes a signal through inverter amplifier 113 and lead 118. Leads 114 and leads 118 are connected to the auxiliary cathodes in a manner similar to leads 46 and 40 shown in Fig. 2. Hence the receipt of pulses through leads 114 and 118, with the pulse through 114 preceding the pulse through 118, causes a one step increase in the stepping voltage in stepping system 104.

Any pulses which are permitted to flow through gate 102 actuate multivibrator 108 which passes a pulse through inverter amplifier 113 and lead 118 to the stepping tube 106, the return of multivibrator 108 to its stable state actuating multivibrator 109 which passes a pulse through inverter amplifier 112 and lead 114 to the stepping tube 106. The stepping system 104 is thus decreased one step in voltage.

A constant current source 120 provides a constant current to the plate (not shown) of tube 106 through resistance 122.

A resistance 124 is included in the stepping system 104. The magnitude of resistance 124 is chosen so that a one step change in stepping tube 106 is equivalent to ten times the change in voltage when stepping tube 50 is increased by one step. Hence it is clear that since the change from the "9" primary cathode to the "0" primary cathode, or vice versa, in stepping tube 50 results in a change in voltage equal to nine times a one step change in voltage, and a one step change in voltage through stepping tube 106 results in a change in voltage equal to ten times a one step change in voltage in stepping tube 50, a net result of a one step change in voltage is obtained. If desired, any number of decades may be used by adding carry-over circuits and providing the necessary resistances in the voltage dividers associated with each tube.

The inclusion of many stepping tubes also increases the accuracy and sensitivity of my new system since for a given input signal range the incremental changes in stepping voltage can be decreased to a lower value than the incremental changes in stepping voltage necessary when only one stepping tube is utilized.

The systems shown in Figs. 2 and 4 can be slightly modified to convert them into systems capable of determining the minimum points or troughs of the input signal across terminal 16 and ground. One way of converting the system is to reverse the positions of the up-count gate 28 and the down-count gate 34 so that the up-count gate is controlled through lead 32 and the down-count gate is controlled through lead 26. The polarity sensor 24 is then connected so that up-counts are fed through lead 32 and down-counts are fed through lead 26 to the up-count gate and down-count gate, respectively. Leads 40 and 46 and leads 114 and 118 are also connected to the auxiliary cathodes in a manner to assure proper stepping direction. Hence, when the first down-count occurs, pulses from pulse generator 36 are fed through lead 62 to the bi-stable multivibrator 60, the up-count gate is closed and the supplementary gate sensitized. When the first up-count subsequently occurs, the supplementary gate is opened and the minimum point of the input signal across terminal 16 and ground is recorded in digital form by the peak recording circuit 14.

I claim:

1. In combination with a comparison means adapted to compare the magnitude of an input signal with a reference voltage and produce an output signal having a polarity dependent upon whether the input signal is of a higher or lower magnitude than the reference voltage, and a reference voltage stepping circuit coupled to the comparison means to receive the output signal and having circuit means for increasing the reference voltage responsive to a comparison means output signal indicating the input signal is higher in magnitude than the reference voltage and circuit means for decreasing the reference voltage responsive to a comparison means output signal indicating the input signal is lower in magnitude than the reference voltage, the improvement which comprises bi-stable means coupled to the circuit means for increasing the reference voltage and to the circuit means for decreasing the reference voltage and responsive to first reference voltage increase signals to prevent a reference voltage decrease, and electrical circuit recording means coupled to the stepping circuit and the bi-stable means and responsive to a first comparison means output signal indicating the input signal is lower in magnitude than the reference voltage adapted to record an indication of the input signal peaks and place the bi-stable means in a condition to allow the reference voltage to decrease.

2. The combination of claim 1 wherein the recording means includes an electronic gate which is sensitized by the bi-stable means in response to a first reference voltage increase signal to thereafter allow first reference voltage decrease signals to be passed therethrough.

3. The combination of claim 2 wherein the recording means also includes a one-shot multivibrator which is actuated by the first reference voltage decrease signals and has a time constant long enough to assure proper time for the recording of the signal peaks.

4. In combination, a comparison means for comparing the magnitude of an input signal with a reference voltage and producing an output signal having a polarity dependent upon whether the input signal is of higher or lower magnitude than the reference voltage, a polarity sensor for receiving the output signal, a stepping circuit including a multi-electrode stepping tube, a reference voltage up-counting circuit and a reference voltage down-counting circuit coupled to the polarity sensor, the up-counting circuit being actuated by a signal from the polarity sensor indicating the input signal is greater than the reference voltage and the down-counting circuit being normally actuated by a signal from the polarity sensor indicating the input signal is less than the reference voltage, a bi-stable multivibrator coupled to the up-counting and down-counting circuits, the bi-stable multivibrator assuming a first stable state in response to first up-counts to prevent down-counts, an electronic gate coupled to the multivibrator and to the down-counting circuit, the electronic gate being sensitized by the multivibrator when the multivibrator assumes the first stable state so that first down-counts are passed through the gate, a one-shot multivibrator coupled to the gate and actuated by the first down-counts to operate a read-out circuit connected to the one-shot multivibrator and the multi-electrode stepping tube, the time constant of the one-shot multivibrator being large enough to permit the digital recording of the highest count in the tube, and a differentiator coupled to the one-shot multivibrator and the bi-stable multivibrator, the output from the differentiator in response to the return of the one-shot multivibrator to its normal state serving to place the bi-stable multivibrator in the second stable state thus permitting the actuation of the down-counting circuit and causing the de-sensitizing of the electronic gate to prevent the recording of counts other than the highest count.

References Cited in the file of this patent

UNITED STATES PATENTS 2,700,750     Dickinson     Jan. 25, 1955